Dec. 15, 1959
H. G. HIGGINS
2,917,621
BAND CLAMP
Filed March 12, 1957
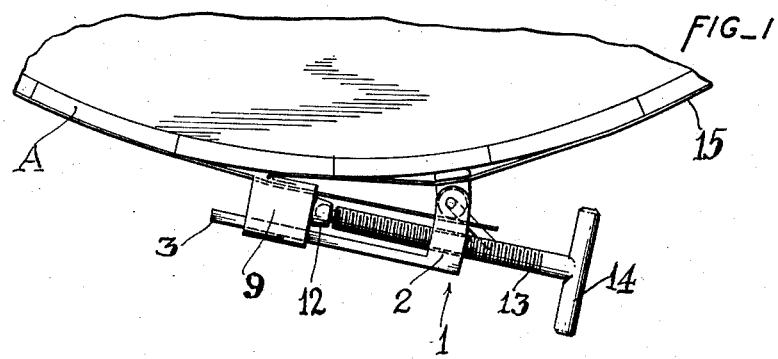
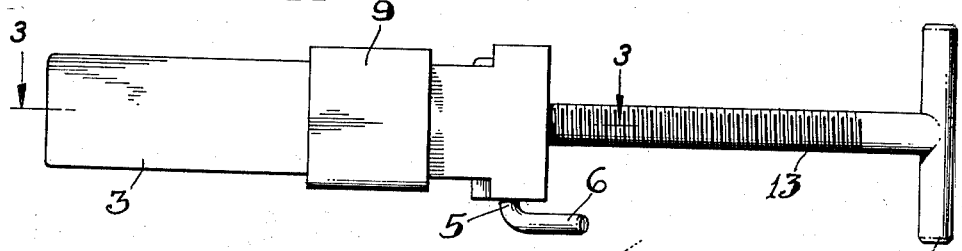
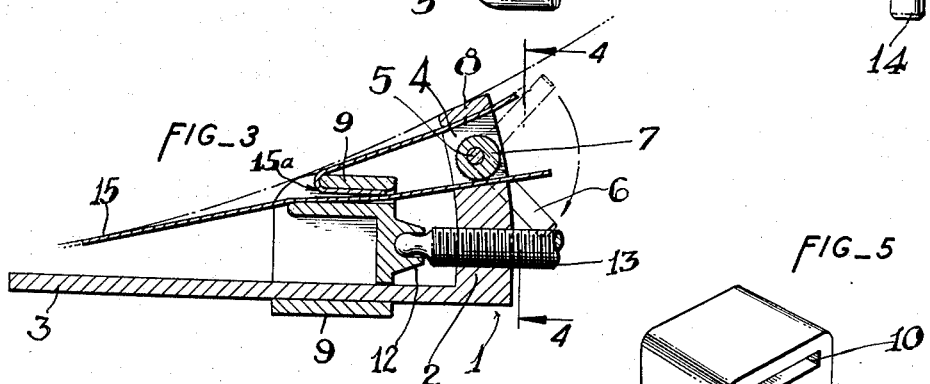
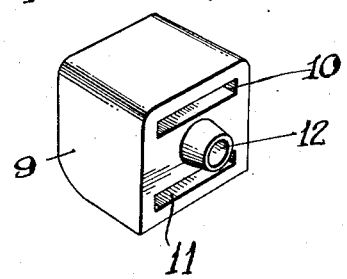
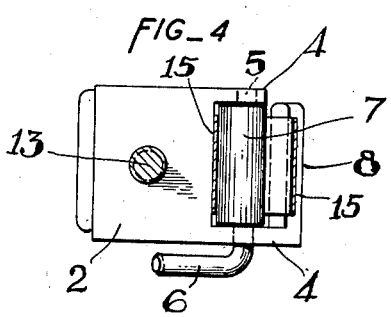
INVENTOR.
Henry Graham Higgins
By J. E. Trabucco
ATTORNEY

United States Patent Office 2,917,621
Patented Dec. 15, 1959

2,917,621

BAND CLAMP

Henry Graham Higgins, San Mateo, Calif.

Application March 12, 1957, Serial No. 645,587

1 Claim. (Cl. 24—280)

This invention relates to improvements in holding devices and more particularly to a band clamp.

The band clamp embodying the present invention is designed primarily for drawing a flexible metal band or strap around a number of elements or parts of a device, to the end that such elements or parts may be clamped tightly together and so held until released.

The present invention provides and has for its objective an improved band clamp embodying two relatively adjustable holders for the ends of a flexible band or strap adapted to extend around an object, such holders being relatively adjustable by screw means to draw the ends of the band tightly around and in clamping relationship with the object.

Another object of my invention is to provide a band clamp of the kind characterized, one which embodies an extensible band which is adapted to extend around objects of various sizes and shapes.

A further object of this invention is the provision of a band clamp, which by reason of its novel and simplified construction is adapted to be easily applied in clamping relationship with an object or objects of different overall sizes and shapes.

Other and further objects of my invention will be pointed out hereinafter or will be indicated in the appended claim or will be obvious to one skilled in the art upon an understanding of the present disclosure. For the purpose of the present application I have elected to show herein certain details of a band clamp which is representative of my invention; it is to be understood, however, that the embodiment of my invention herein shown and described is for purposes of illustration only, and that therefore it is not to be regarded as exhaustive of the variations of the invention in the art.

In the accompanying drawing:

Fig. 1 is a side elevational view of my band clamp, showing it, for illustration purposes, in clamping relationship with the staves of a barrel;

Fig. 2 is a bottom plan view, on an enlarged scale, of my band clamp;

Fig. 3 is a sectional view taken on the line 3—3 of Fig. 2;

Fig. 4 is a sectional view taken on the line 4—4 of Fig. 3; and

Fig. 5 is a perspective view of an adjustable member to which one end of a flexible band or strap is attached.

While I have shown my invention applied to a barrel for illustration purposes, it is to be understood that it is also adapted for use with various other devices or objects which are to be secured in clamped relationship.

Referring to the drawing, the numeral 1 designates a supporting structure or frame comprising a screw supporting member 2, preferably of arcuate shape, and an elongated arm 3. The arm is substantially of uniform width and thickness throughout its length, and such arm is arranged at approximately right angles to the member 2. Projecting upwardly from the member 2 are opposed side flanges 4 which rotatably support a shaft 5 having a handle 6 at one end. Secured to the shaft 5 and arranged in clamping relationship with the upper side of the member 2 is a serrated cylindrical cam 7 which is eccentrically arranged with respect to the shaft. Secured to one of the upstanding flanges 4 and positioned in an overlying position with respect to the cam 7 and the upper side of supporting member 2 is band restraining element 8. The lower side of the element 8 and the upper opposed side of the supporting member 2 are preferably arranged in forwardly converging relationship.

Mounted for sliding movement on the arm 3 is a pressure block or member 9 which has slotted openings 10 and 11 at its upper and lower sides, respectively. The pressure block 9 is formed with a centrally disposed socket member 12 at its rear side and engaging therewith is the rounded forward end of a pressure screw 13, such pressure screw extending through a threaded opening in the block and having an operating handle 14 at its rear end.

Associated with the supporting frame 1 and the adjustable pressure block 9 is a flexible steel band or strap 15 which is adapted to be clamped around the object or objects A to be securely held. One end of the band 15 is bent rearwardly as at 15a and then inserted rearwardly into the upper slotted opening 10 from its forward end, thereby securing this end of the band against detachment from the block when the latter is adjusted forwardly along the arm 3. The band is extended around the object or objects to be held in clamped relationship and the opposite end portion of the said band is passed rearwardly through the upper slot 10 in the block 9 and through the space between the cam 7 and the upper side of the supporting member 2. The engaged lower surface of the band restraining element 8 is positioned considerably above the upper slotted opening 10 of the block 9, and the upper surface of the supporting member 2 is also arranged at a slightly higher level than such slotted opening. By positioning the slot 10 of the block at a lower level than the upper side of the supporting member 2, that portion of the band extending through such slot will be held in pressure applying relationship with the rearwardly disposed end portion of the band extending into this slot, thereby preventing its detachment from the block when pressure is applied to the latter through the screw 13. When the band is extended fairly tightly around the object or objects A, the handle 7 is swung downwardly, thereby rotating the cam 7 into clamping engagement with the band as indicated by the arrow in Fig. 3, thus securely holding such band from slipping as the block 9 is adjusted forwardly through the pressure screw 13. As the pressure screw 13 is turned to adjust the pressure block forwardly along the arm 3, that end of the band which is secured to the block is also carried forwardly, and since the opposite end portion of the band is securely held against slipping between the cam 7 and the supporting member 2, the band is tightened around the object or objects. The band is securely held in clamped relation with respect to such object or objects until the screw 13 is turned in a reverse direction to permit the rearward movement of the block 9 or until the cam 7 is turned to release the band.

By providing suitably shaped narrow openings in the block rather than slotted openings, a wire band may be used in place of the flat type band.

What I claim is:

In a band clamp, a supporting frame having an elongated rigid arm and an upstanding member arranged at substantially right angles to the arm, a pair of laterally spaced and opposed side flanges extending upwardly from the upstanding member, a cylindrical cam mounted on and between the flanges and arranged in clamping relationship with the upper side of the supporting member, a restraining member secured to one of the flanges and arranged in overlying spaced relation to the cam, a pressure block slidably mounted on the arm and having a transverse slotted opening in its upper portion, a pressure screw adjustably extending through the supporting member and arranged in pressure applying relationship with the block, and a flexible band having one end extending into the slotted opening of the block and secured to the said block and arranged with its other end portion extending through the slotted opening in the block and extending between the cam and the supporting member, the band being clamped between the cam and the upper side of the supporting member and the band also extending beneath and in engaging relationship with the restraining member.

References Cited in the file of this patent

UNITED STATES PATENTS

| | | |
|---|---|---|
| 397,262 | Williams | Feb. 5, 1889 |
| 493,330 | Harding | Mar. 14, 1893 |
| 908,325 | Platts | Dec. 29, 1908 |
| 1,625,258 | Jelbert | Apr. 19, 1927 |
| 1,990,820 | Flader | Feb. 12, 1935 |
| 2,588,501 | Dummer | Mar. 11, 1952 |

FOREIGN PATENTS

| | | |
|---|---|---|
| 8,194 | Great Britain | Apr. 13, 1908 |
| 544,278 | Great Britain | Apr. 7, 1942 |